(12) United States Patent
Jin et al.

(10) Patent No.: US 9,671,278 B2
(45) Date of Patent: Jun. 6, 2017

(54) TOILET FLUSH DETECTION SYSTEM UTILIZING TRANSDUCER WITH PIEZOELECTRIC SOUNDER ELEMENT

(75) Inventors: Wu Jin, Dongguan (CN); Jacobus Simon Petrus Van Diepen, Dongguan (CN); Dave Thomas, Newton Abbot (GB); Larry Tyson, Newton Abbot (GB)

(73) Assignee: Reckitt Benckiser LLC, Parsippany, NJ (US)

( * ) Notice: Subject to any disclaimer, the term of this patent is extended or adjusted under 35 U.S.C. 154(b) by 532 days.

(21) Appl. No.: 13/574,381

(22) PCT Filed: Jan. 13, 2011

(86) PCT No.: PCT/GB2011/050042
§ 371 (c)(1),
(2), (4) Date: Nov. 6, 2012

(87) PCT Pub. No.: WO2011/089409
PCT Pub. Date: Jul. 28, 2011

(65) Prior Publication Data
US 2013/0047732 A1 Feb. 28, 2013

(30) Foreign Application Priority Data
Jan. 22, 2010 (GB) .................................. 1001004.9

(51) Int. Cl.
*G01H 11/08* (2006.01)
*E03D 5/10* (2006.01)
(Continued)

(52) U.S. Cl.
CPC ............... *G01H 11/08* (2013.01); *E03D 5/10* (2013.01)

(58) Field of Classification Search
CPC .......... G01H 11/08; G01H 3/00; G01P 15/09; E03D 3/00; E03D 9/00
(Continued)

(56) References Cited

U.S. PATENT DOCUMENTS 3,641,414 A * 2/1972 Thompson et al. .......... 318/662
4,586,377 A * 5/1986 Schmid ............... G01P 15/0907
310/329
(Continued)

FOREIGN PATENT DOCUMENTS

EP 0116810 A1 8/1984
GB 2144308 A 2/1985
(Continued)

OTHER PUBLICATIONS

English language abstract of JP 2005036511 which was published Dec. 2, 2005.
(Continued)

*Primary Examiner* — Michael A Lyons
*Assistant Examiner* — Suman K Nath
(74) *Attorney, Agent, or Firm* — Norris McLaughlin & Marcus PA (57) ABSTRACT

An arrangement for detecting toilet flushing by utilizing an acoustically-based motion detector in a simple amplifier circuit. The detector is in contact with the toilet bowl, which acts as a resonant system. Upon detection of such flushing, a subsequent event, such as a cleaning or disinfecting a toilet, ventilating the surrounding area or releasing deodorant into the area, may be triggered. The mechanically resonant system with the provided circuit is capable of separating frequencies from the frequency of the flushing water in a specific bowl design and provides a high degree
(Continued)

of immunity to unwanted ambient frequencies. In addition, the system consumes low power and is suitable for battery power operation.

9 Claims, 8 Drawing Sheets

(51) Int. Cl.
    *G01H 3/00*           (2006.01)
    *G01P 15/09*         (2006.01)
    *E03D 3/00*           (2006.01)
    *E03D 9/00*           (2006.01)

(58) Field of Classification Search
    USPC ................... 340/692; 73/579, 514.34, 290 V
    See application file for complete search history.

(56) References Cited

U.S. PATENT DOCUMENTS

| | | | | |
|---|---|---|---|---|
| 4,996,675 A | * | 2/1991 | Beauducel | B06B 1/0685 310/337 |
| 5,029,474 A | * | 7/1991 | Schulze | G10K 11/02 73/587 |
| 5,168,673 A | * | 12/1992 | Nemir et al. | 52/1 |
| 6,249,074 B1 | * | 6/2001 | Zimnicki | H03H 3/04 310/312 |
| 8,310,369 B1 | * | 11/2012 | Canfield | E03D 1/00 340/605 |
| 2003/0021458 A1 | * | 1/2003 | Hamada et al. | B06B 1/0603 382/135 |
| 2006/0187272 A1 | * | 8/2006 | Torii | B41J 2/14233 347/68 |

FOREIGN PATENT DOCUMENTS

| | | |
|---|---|---|
| JP | 2005036511 A | 12/2005 |
| WO | 0212843 A2 | 2/2002 |

OTHER PUBLICATIONS

International Search Report for PCT/GB2011/050042 dated May 3, 2011.
GB Search Report for GB1001004.9 dated May 20, 2010.
Written Opinion of the International Search Report for PCT/GB2011/050042 dated May 3, 2011.
"Fundamental Noise Limit of Piezoelectric Accelerometer", Felix A. Levinzon, IEEE Service Center, NY, US vol. 4, No. 1, Feb. 1, 2004, pp. 108-111.

* cited by examiner

FIG.12

TOILET FLUSH DETECTION SYSTEM UTILIZING TRANSDUCER WITH PIEZOELECTRIC SOUNDER ELEMENT

This is an application filed under 35 USC 371 of PCT/GB2011/050042.

The present invention relates to an arrangement for detecting toilet flushing by utilizing an acoustically-based motion detector in a simple amplifier circuit in the vicinity of the toilet bowl. Upon detection of such flushing, a subsequent event, such as a cleaning or disinfecting a toilet, ventilating the surrounding area or releasing deodorant into the area, may be triggered.

The need for electronically detecting toilet flushing has long been recognized and addressed. This need arose from the desire to administer a cleaning/deodorizing cycle of a toilet bowl after flushing, particularly in public toilets. Known flushing detection arrangements are based on methods detecting the flushing water.

U.S. Pub. 2009/0249533 discloses a device for cleaning and deodorizing a toilet bowl. This reference teaches spraying an inner surface of a toilet bowl with a cleaning and/or deodorizing chemical after flushing. The device includes a container for the chemical, a spray nozzle through which the chemical can be sprayed laterally around a perimeter of the bowl, a conduit in fluid communication with the container and the spray nozzle, fluid delivery means for delivering chemical from the container through the conduit and to the spray nozzle, and means for attaching the spray nozzle near a rim of the toilet bowl. Flushing is being recognized by a sensor mounted in housing near the toilet rim. The housing also accommodates an electronic circuit. The sensors used are either proximity sensors, light sensors, sound sensors, vibration sensors, motion sensors, tilt sensors, flush sensor, or any combination of two or more of these sensors. Any such sensor is electrically connected to a controller to influence when the cleaning fluid is dispensed to the toilet bowl.

U.S. Pat. No. 6,098,211 also addresses triggering a cleaning, ventilation or disinfecting routine upon flushing of a toilet. This is achieved by utilizing an acoustic sensor, arranged in close proximity to a flushing area or inflow of the water into the bowl. Due to such placement, the patent teaches an improved differentiation of the sound that is being sensed from otherwise interfering sound sources which may be present in the restroom, especially a larger public restroom. Beyond optimal placement of the sensor, the reference does not recognize the need for sensors or circuitry which accommodates for differentiating between flushing sounds and other sounds or noise that may also trigger the cleaning, ventilation or disinfecting cycle. Thus, there is a need for utilizing a reliable arrangement which uses a sensor and circuitry which is capable of differentiating specifically between sound qualities and which only responds to one specific sound.

Sensors responsive to specific sounds are also widely used in applications other than detecting toilet flushing. Such sensors range from a simple embodiment which is responsive to a noise of any kind regardless of its audio spectrum, to extremely sophisticated systems utilizing expensive and complex signal processing techniques for example speech recognition systems.

An intermediate class of sensors exists which is responsive to a particular frequency or amplitude of sounds. Such intermediate class of sensors is commonly used with an acoustic transducer (microphone), an amplifier and a signal processing stage. Such a signal processing stage is often a frequency filtering system so that the system is responsive only to a selected range of frequencies which are determined by the design of the unit.

Thus, there is a need for providing a new resonant system with circuitry that is capable of distinguishing between a spectrum of sounds and for isolating the sound generated only by the flushing toilet, upon which a cleaning, deodorizing or ventilation cycle can start.

This object is achieved by the device of the present invention, wherein a mechanically resonant system in conjunction with a simple amplifier circuit is provided. Such system is capable of separating frequencies from a frequency of interest, which is the frequency of the flushing water in a specific bowl design. Thus, the system provides a high degree of immunity to unwanted ambient frequencies (signals). In addition, only a system with low power consumption is suitable, preferably the system operates with battery power.

The proposed device is affixed to a part of a toilet bowl, e.g., the rim of a toilet bowl, whereby the bowl or pan provides the mechanical resonant system. The device includes a piezoelectric accelerometer which is in direct contact with the bowl. Preferably the piezoelectric accelerometer is mounted such that it abuts a part of the toilet bowl, and preferably is in physical contact with an outer surface of the toilet bowl. The mounting of the arrangement is critical, in that the transducer is responsive only to mechanical resonances of the toilet bowl. The advantage of this mounting is that the system automatically adapts to different types and styles of toilet bowl. It is desirable that the accelerometer is responsive to resonant vibrations of the lavatory bowl because during a flush event, turbulent water flow will excite vibrations in the lavatory bowl at certain frequencies. Because the toilet bowl is relatively massive, external stimulation of bowl vibrations by ambient noise is negligible compared to vibrations caused by the water flow from the flushing. The spectrum of noise produced by turbulent water flow approximates that of white noise. It is characteristic of white noise that both the frequency and amplitude of the signal is unpredictable at any instant in time and that frequency and amplitude ranges are constrained within certain limits. If a white noise signal is demodulated and averaged over a sufficient period of time and applied to a known load, a power level can be attributed to the signal.

The use of a mechanically resonant, frequency selective technique provides a system which automatically adapts to variations in white noise spectral distribution arising from different bowl designs. In particular, the use of the piezoelectric device is a reliable and inexpensive way of converting physical motion of the flushing water into electrical energy motion and exhibit a high tolerance to environmental factors such as humidity. It will be seen that the various modes of mechanical resonance existing in the bowl in conjunction with a piezoelectric accelerometer acts as a frequency selective system so that only those frequencies present in the white noise spectral distribution are passed to the amplifier circuit for subsequent processing. The resulting power level which is derived is measured over each of many consecutive time intervals such that a histogram of time history of the mean power detected (hence the energy density) is derived. It is the form of this histogram which provides the characteristic information relating to the event detected by the system. Analysis of the overall form of the histogram by way of a processing system (such as a microcontroller) is then applied in order to discriminate between flush events and non-flush events. Typically, aspects of the histogram which might be considered in this discrimination process are rise time of leading edge, amplitude, duration, fall time of trailing edge, deviation from a short-term mean, total energy content and repeatability.

Other aspects of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

In the drawings, wherein like reference numerals delineate similar elements throughout the several views.

Figure 1:
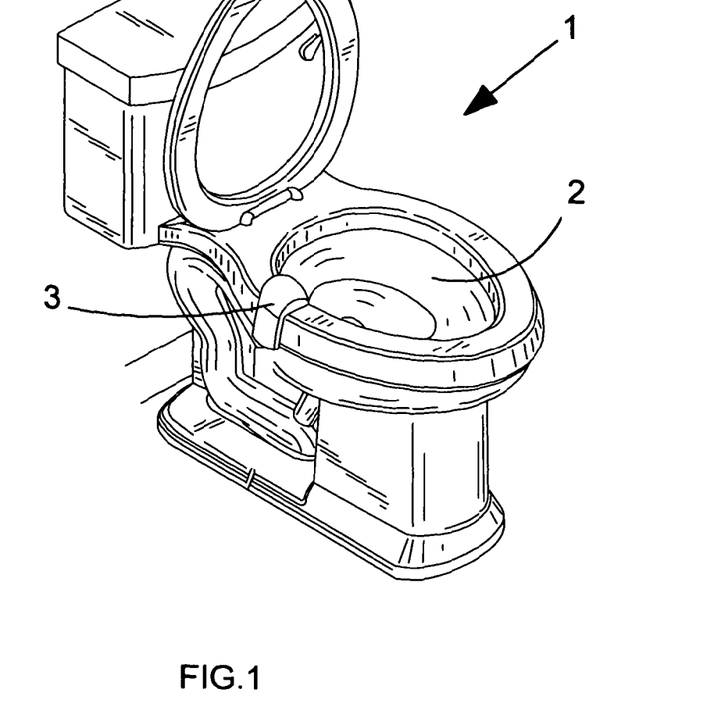
FIG. 1 illustrates an overall view of a toilet bowl with the device of the present invention mounted at the rim.

Turning to the Figs., there is shown in FIG. 1 a typical set up of the device, showing a toilet 1 with a typical bowl 2 with the device 3 of the present invention being mounted on the rim of the toilet.

Figure 2:
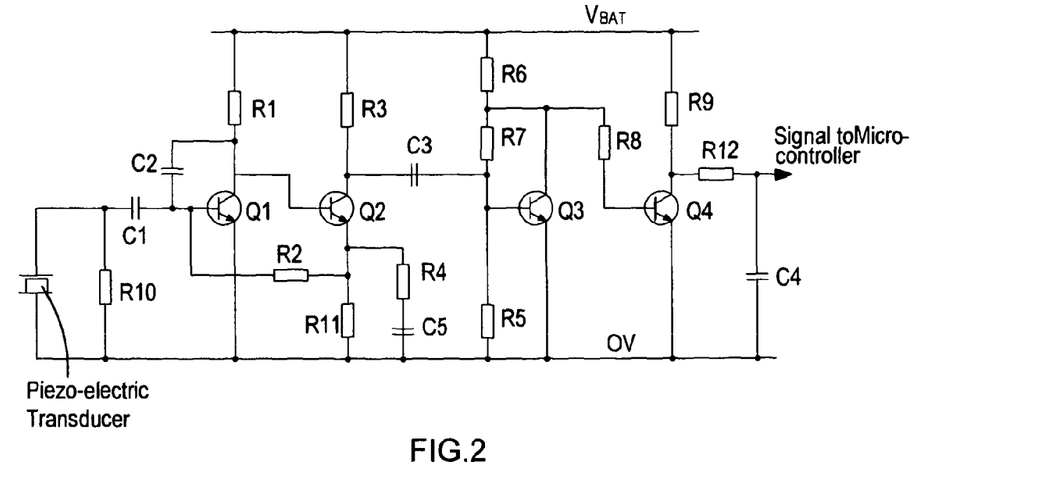
FIG. 2 illustrates a circuit utilizing discrete transistors in one embodiment of the present invention.

FIG. 2 illustrates an exemplary suitable circuit adapted for low power consumption. The circuit diagram of FIG. 2 illustrates the use of discrete transistors.

The circuit uses transistors Q1, Q2 and Q3 form a conventional AC-coupled amplifier circuit having an input at the base of Q1 and an output at the collector of Q3. When the amplifier is in the quiescent condition a steady-state bias voltage (typically one half of the supply voltage) exists at the collector of Q3. This voltage causes a current to flow through resistor R8 into the base terminal of transistor Q4. This current is arranged by design to be just sufficient to hold Q4 in a saturated conducting state so that the collector of Q4 is at a low voltage level when the amplifier is quiescent. When the amplifier is stimulated by an input signal the voltage at the collector of transistor Q3 will represent an amplified version of the input signal.

Because this signal is coupled to the base terminal of Q4, the base current of Q4 will vary so as to allow Q4 to vary between the quiescent saturated condition and having a collector voltage proportional to the amplitude of the input signal. In this way transistor Q4 operates both as an amplifier stage and a demodulator (rectifying) stage. It will be seen that the average voltage present at the collector of Q4 will be a function of the amplitude of the input signal. The collector voltage of Q4 may be conveniently averaged as shown comprising R12 and C4. It is further the case that if the time constants of R12 and C4 are appropriately chosen then the charge stored on C4 will be a function of the energy density of the input signal. The voltage thus appearing across C4 may be readily interfaced with a low-cost microcontroller.

The key advantage of the circuit based upon the use of discrete transistors is one of power consumption. The current drawn by this circuit is typically of the order of 50 ρA and hence the circuit is well suited for prolonged operation when powered from batteries.

Figure 3:
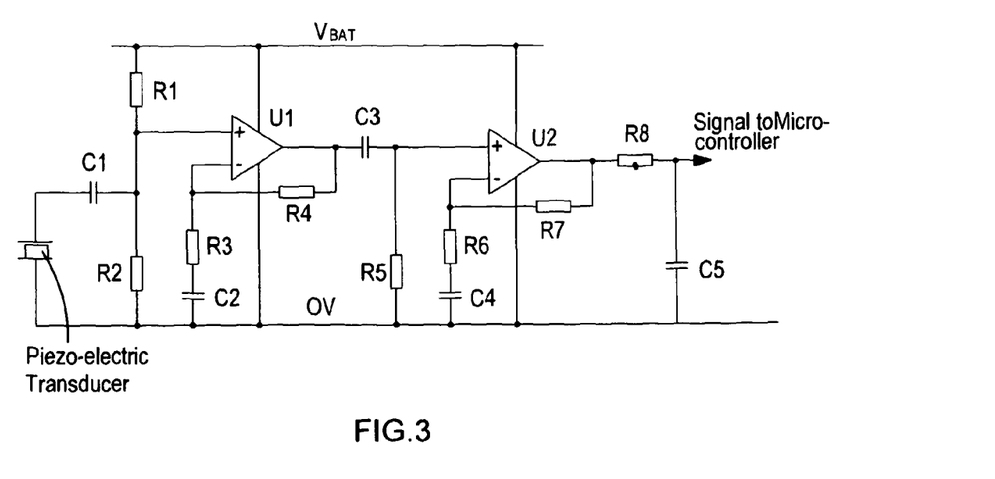
FIG. 3 illustrates a circuit utilizing operational amplifier in another embodiment of the invention.

FIG. 3 illustrates a circuit using operational amplifiers. The signal from the piezoelectric transducer is AC-coupled by capacitor C1 into a first stage of amplification based around operational amplifier U1. U1 operates in a non-inverting configuration with its gain determined by resistors R3 and R4, and having its frequency response modified by the inclusion of capacitor C2 which reduces low frequency gain. The input to U1 is biased to typically half of the supply voltage by resistors R1 and R2 such that the output signal from U1 is similarly biased to this voltage. The output from U1 is AC coupled by capacitor C3 to a second non-inverting gain stage which is comprised of operational amplifier U2 and associated components. The input to this second stage however is biased by resistor R5 to the negative voltage supply such that U2 only responds to positive half cycles of the signal from U1. This second stage therefore performs a demodulation function. As with the first stage, the gain of U2 is determined by resistors R6 and R7, and having its frequency response modified by the inclusion of capacitor C4. The combined frequency response of the two stages of amplification (due to the inclusion of C2 and C4) serves to reduce the sensitivity f the circuit to mains hum and other low frequency signals. Typically the circuit is responsive to signals having a frequency greater than approximately 500 Hz.

The demodulated output signal from of U2 is averaged as shown by way of resistor R8 and capacitor C5. As with the transistor-based circuit, the time constants of R8 and C5 are appropriately chosen such that the charge stored on C5 will be a function of the energy density of the input signal. The voltage thus appearing across C5 may be readily interfaced with a low-cost microcontroller.

Figure 4:
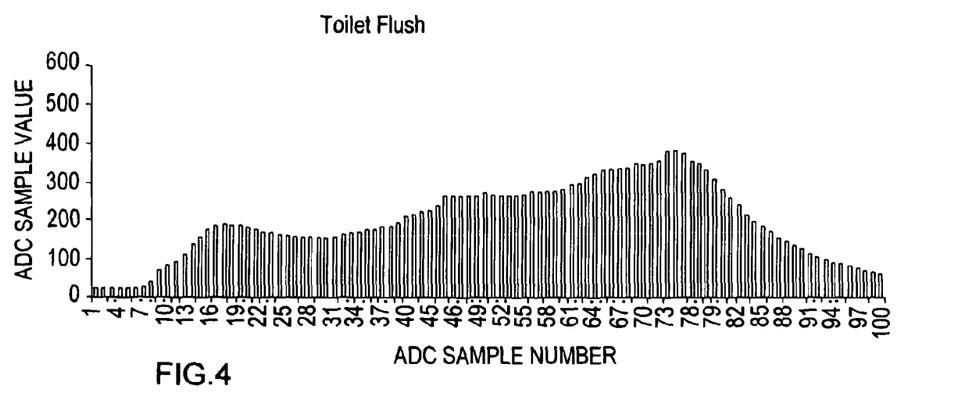
FIG. 4 illustrates a typical energy density histogram for a flushing event.

In order to provide the ability to discriminate between flush and non-flush events, the time history of the energy density of the signal detected by the accelerometer is interfaced to a microcontroller. The voltage generated across the averaging capacitor of the previous circuits (C4 in FIG. 2 or C5 in FIG. 3) is interfaced to such a microcontroller by way of some form of analogue-to-digital converter (ADC). Typically a simple integrating type of ADC would be used in order to provide a simple and low-cost solution. The microcontroller is therefore able to periodically sample the voltage appearing across the averaging capacitor, and thus able to deduce a time history of the energy density. The resulting histogram of energy density time history for a typical flush event is shown in FIG. 4.

Figure 5:
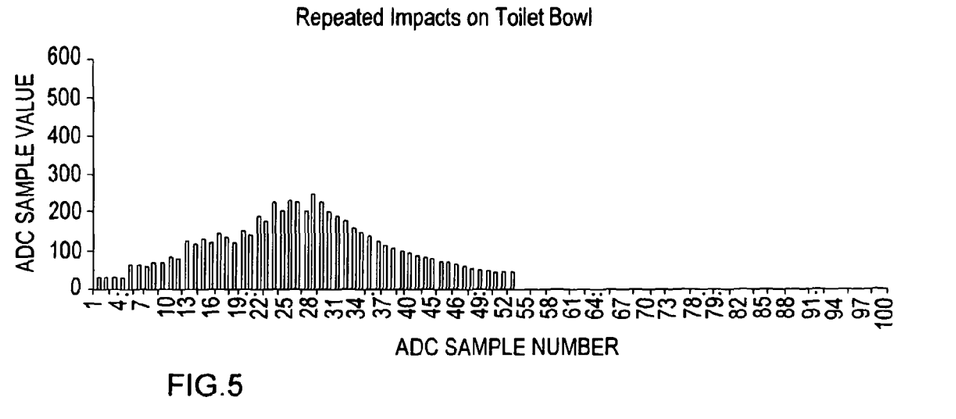
FIG. 5 illustrates a typical energy density histogram for repeated impacts on a toilet bowl.
Figure 6:
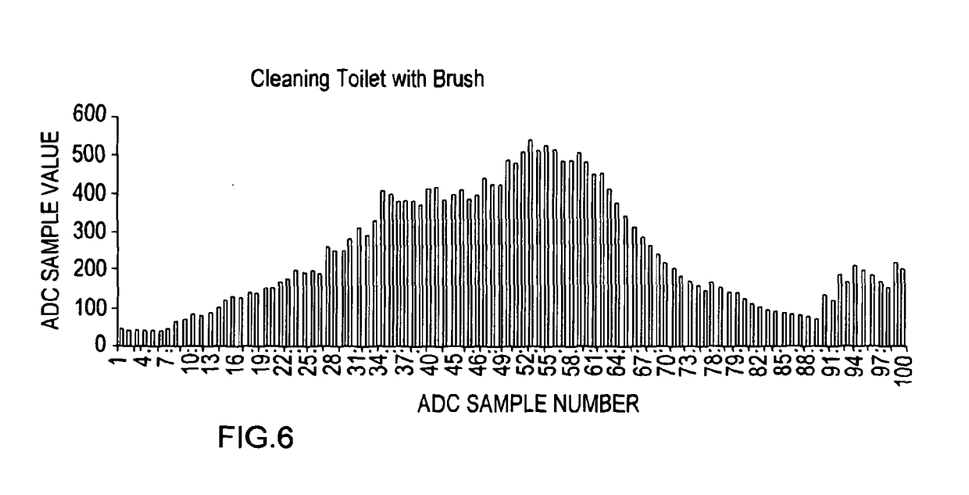
FIG. 6 illustrates a typical density histogram for cleaning toilet with conventional brush.
Figure 7:
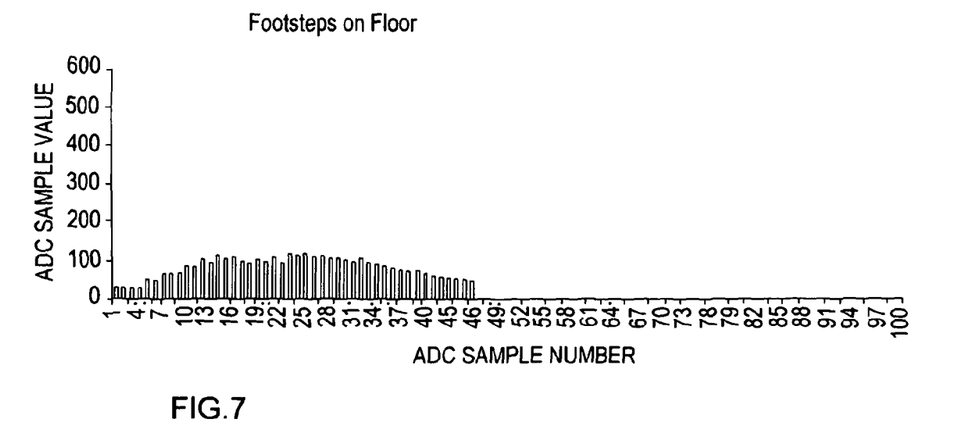
FIG. 7 illustrates a typical density histogram for registering footsteps on the floor.

Further examples of the histogram resulting from several types of non-flushing event are shown in FIGS. 5, 6 and 7. It will become apparent, that there are distinct differences between these various events in terms of the characteristics of the histogram data.

It is the form of this histogram which provides the characteristic information relating to the event detected by the system. Analysis of the overall form of the histogram by way of the microcontroller is then applied in order to discriminate between flush events and non-flush events. Typically, aspects of the histogram which might be considered in this discrimination process are rise time of leading edge, amplitude, duration, fall time of trailing edge, deviation from a short-term mean, total energy content and repeatability.

It should be noted that at the present time such a discrimination algorithm is in development and a good degree of discrimination success obtained. However further development and refinement of the algorithm is still necessary and hence it is not yet possible to provide complete details of the discrimination process.

The transducer which is used to acquire an electrical representation of the vibration of the toilet bowl is essentially an accelerometer. Many types of commercial accelerometers are available, although these generally suffer from disadvantages which make them unsuitable for use in this application. Such disadvantages include (1) the size, shape and aspect ratio may be unsuitable for incorporation into the form of a compact domestic product; (2) the materials used in the construction of an accelerometer may be incompatible with the chemicals used in the cleaning, disinfection or deodorizing of toilets; (3) many accelerometers produce a purely digital output signal which is incompatible with the technique developed for this application; (4) many accelerometers have a frequency response which is restricted to frequencies which are too low to afford a useful measure of the events which must be characterized; and (5) commercial accelerometers are generally of a cost substantially higher than would be acceptable in this application.

For these reasons, a suitable embodiment of accelerometer has been developed by way of the use of a conventional 2-terminal piezoelectric transducer of the type usually used as a "sounder" which produces an audible sound in response to an electrical stimulus. Such devices operate upon the piezoelectric principle. The piezoelectric principle applies to specific types of solid material which will behave in either of two fundamental modes as follows: (1) The material will mechanically distort in response to an applied electrical signal. This is the case of the conventional use of a piezoelectric sounder; (2) the material will produce an electrical signal in response to an applied mechanical deformation. This is the case of a piezoelectric accelerometer.

Figure 8:
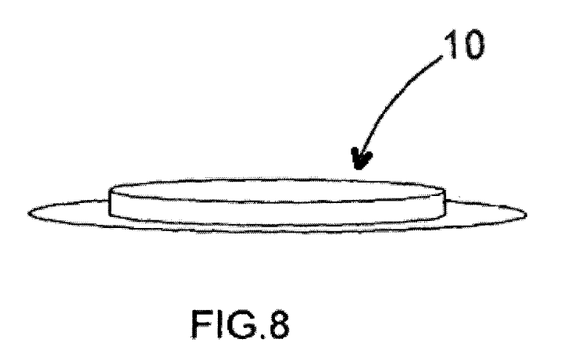
FIG. 8 illustrates a conventional piezo electric sounder.
Figure 9:
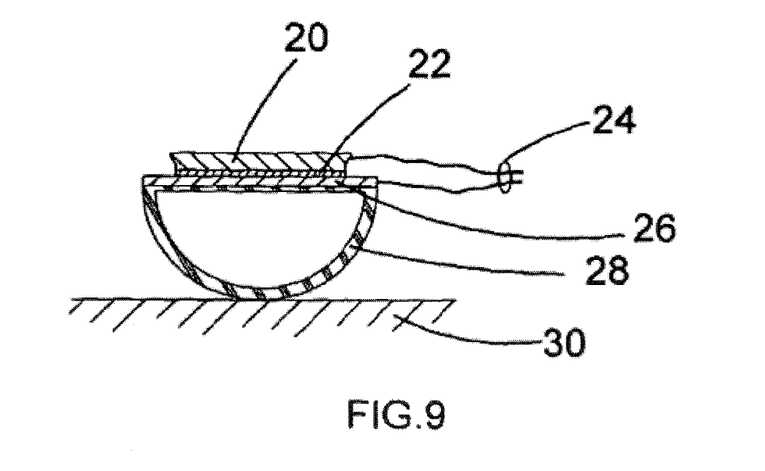
FIG. 9 illustrates a transducer using a piezoelectric sounder element.

FIG. 8 shows a conventional piezoelectric sounder 10. The electrical connections to the sounder are made by way of connection to the conductive metallic disc and to the metalized surface. An AC electrical signal applied between these connections will cause the piezoelectric material to distort in harmony with the signal, producing localized vibrational variations in air pressure and hence sound waves. The size of such sounders is typically between 12 mm and 30 mm in diameter. A sectional view of the transducer embodiment used in the present invention is shown in FIG. 9. This embodiment uses a piezoelectric element having an overall diameter of 20 mm. 20 illustrates a metal disc which provides the seismic mass; 22 illustrates the piezoelectric element; 24 illustrates the electric connections; 26 illustrates the metal disc serving as a stiffener; 28 illustrates a hemispherical plastic shell being in contact with the bowl; 30 illustrates the toilet bowl. More specifically, the metal disc 20 is bonded to either side of the piezoelectric element 22 such that each is in electrically conductive contact with one terminal of the device. Electrical connections 24 which serve as the electrical signal output of the accelerometer are made to these discs. One of the metal discs (26) is then bonded to the open face of a rigid hemispherical plastic shell 28. The convex surface of the hemispherical shell is then forcibly held in contact with the surface of the toilet bowl 30. However, the form of the shell is not crucial, as long as the shell is suitable of being held in contact with the surface of the bowl or pan.

The purpose of the metal disc 26 which is located between the hemispherical shell and the piezoelectric element 22 is to provide a stiffening of the piezo device such that it substantially loses any tendency to act as a microphone. If such a piezoelectric sounder were suspended in free air and exposed to modest sound levels, a signal would be generated at its electrical connections. Such a microphonic response has been shown to be detrimental in this use, hence the addition of the metal disc stiffener component.

Vibrations of the toilet bowl substrate are imparted to the hemispherical shell 28 and in turn to the stiffener disc and the piezoelectric element.

The purpose of the metal disc 26 which is located upon the side of the piezoelectric element opposite the hemispherical shell 28 is to provide a so-called seismic mass. The mass of this disc will present a mechanical inertia to the vibrational system. Hence the vibrations which are imparted to the piezoelectric element in conjunction with the seismic mass will cause compressions and expansions of the piezoelectric material which will be in sympathy with the vibrations of the toilet pan. This distortion of the piezoelectric material in turn will generate a corresponding electrical signal at the terminals of the device. This signal serves as the input to the electronic circuit of the system.

Figure 10:
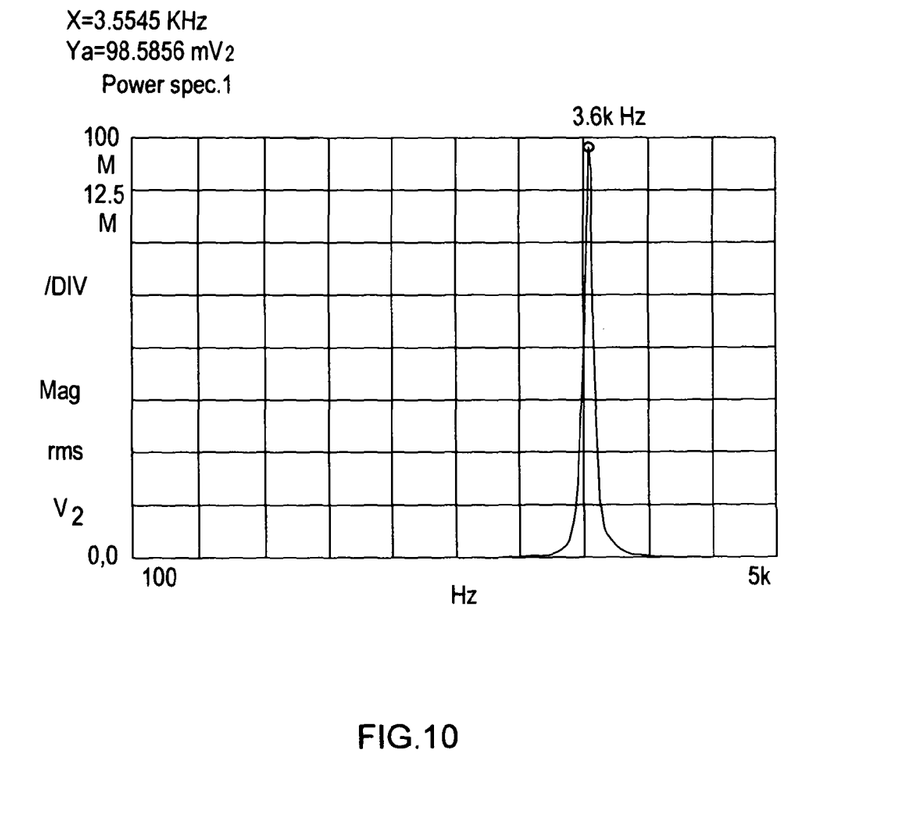
FIG. 10 illustrates a microphonic response of typical a piezoelectric sounder.

It is important to note that the frequency response of a typical piezoelectric element and how this is modified by its use in the accelerometer embodiment described. The frequency response to sound waves (i.e., when used as a microphone) of a typical 20 mm diameter piezoelectric sounder mounted unrestrained in free-air is shown in FIG. 10.

Figure 11:
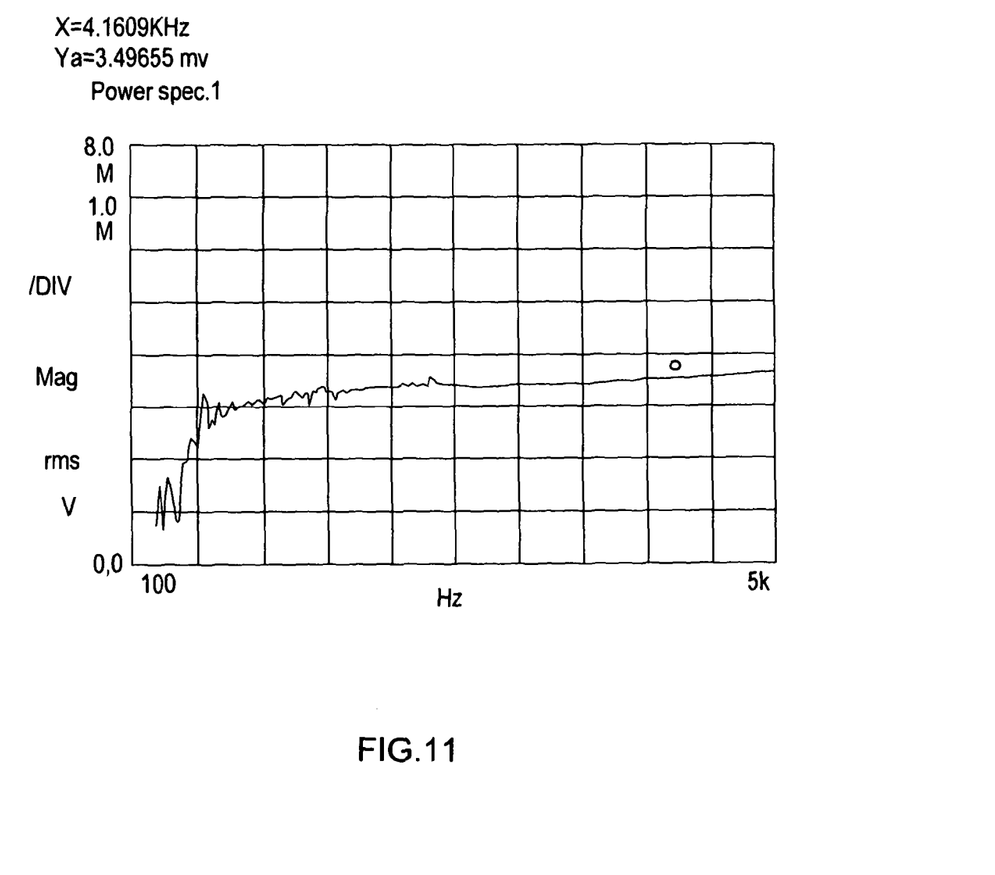
FIG. 11 illustrates an accelerometer frequency response.

It may be seen that this frequency response is highly resonant, with a pronounced peak occurring at the same 3.6 kHz frequency at which the sounder is designed to operate when used as a sound generating device. The frequency response of the accelerometer embodiment (shown in FIG. 9) when exposed to vibration is shown in FIG. 11. It may be seen that a substantially flatter accelerometer response is obtained compared with the sound response of the piezoelectric element in isolation, and with a total absence of the 3.6 kHz resonant peak previously observed. This flat response is suited much better to this application.

Figure 12:
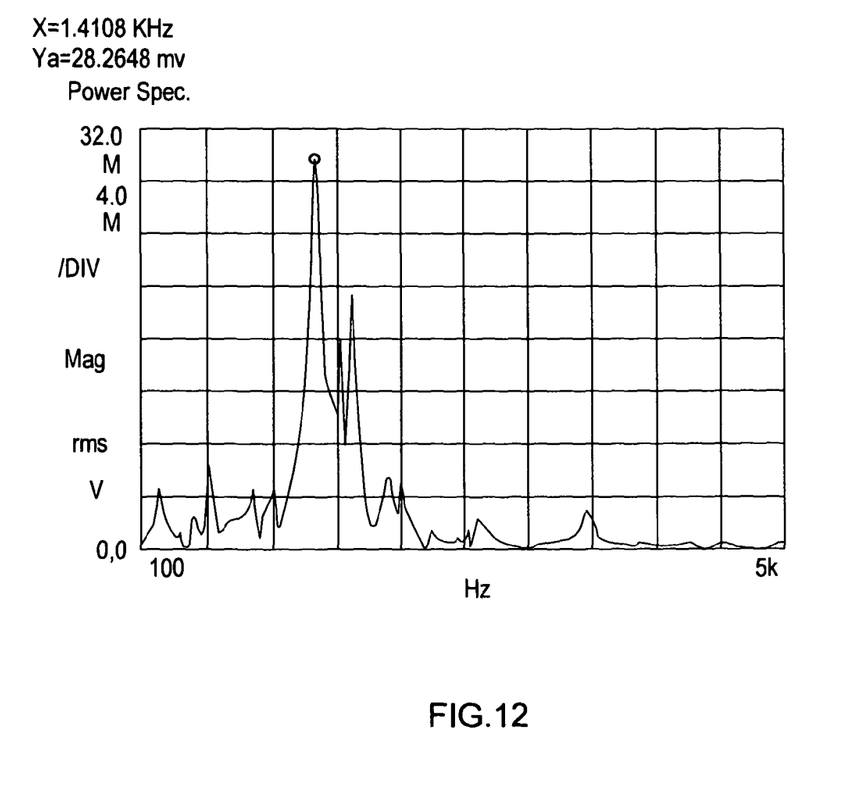
FIG. 12 illustrates an accelerometer signal produced by a typical toilet.

FIG. 12 shows a typical spectrum produced by the accelerometer when mounted to a toilet bowl which is exposed to stimulation by broad-band excitation. This spectrum clearly shows the various resonant peaks of the toilet bowl structure. The signal produced by the accelerometer during both flush and non-flush events will have a broadly similar spectrum but with a time-varying energy content. Any stimulation of the toilet at other frequencies will not excite resonances of the toilet bowl and hence will not feature substantially in the output spectrum of the accelerometer.

It is important to note that the broad-band flat response of the accelerometer as shown in FIG. 11 is essential to the useful detection of the various frequency spectra produced by the anticipated range of toilets. The original (highly resonant) microphonic frequency response shown in FIG. 10 would only respond to the energy content of the vibrations over a very small narrow bandwidth and hence would disregard the majority of the useful spectral output from the toilet.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention claimed is:

1. A method for detecting toilet flushing in a toilet bowl, the method utilizing a mechanically resonant frequency selective technique capable of adapting to variations in a noise-producing spectrum, wherein the detecting method comprises the steps of:
providing an apparatus having an electrical circuit adapted to select a specific frequency in a spectral distribution of frequencies received from a piezoelectric accelerometer device, which piezoelectric accelerometer device includes the following elements sequentially layered in register and in interfacial contact:
a seismic element,
a piezoelectric transducer,
a metal disc which operates as a stiffener and which is in contact with and is bonded to a peripheral edge of a bowl shaped shell having a convex surface,
affixing at least the convex surface of the bowl shaped shell to forcibly hold said outer convex surface in contact with a surface of a part of the toilet bowl during the detection of toilet flushing; and,
during toilet flushing, passing signals from the piezoelectric accelerometer device to the electrical circuit which processes said signals.

2. The method of claim 1, wherein the shell is a hemispherical plastic shell.

3. The method of claim 1, wherein the shell is a plastic shell.

4. The method of claim 1, wherein the shell is a hemispherical shell.

5. The method of claim 1, wherein the electrical circuit operates in a manner to be responsive only to mechanical resonances of the toilet bowl.

6. The method of claim 5, wherein the electrical circuit operates to be responsive only to mechanical resonances of the toilet bowl which are caused by turbulent water flow within the toilet bowl.

7. An apparatus operable to detect flushing in a toilet bowl which apparatus comprises:
a piezoelectric accelerometer device, which includes the following elements sequentially layered in register and in interfacial contact:
a seismic element,
a piezoelectric transducer,
a metal disc which operates as a stiffener and which is in contact with and is bonded to a peripheral edge of a bowl shaped shell having a convex surface which convex surface is adapted to be forcibly held in contact with a surface of a part of the toilet bowl during the detection of toilet flushing;
and,
an electrical circuit adapted to select a specific frequency in a spectral distribution of frequencies, which specific frequency correlates to the frequency of the piezoelectric transducer during a flush event, wherein the electrical circuit is operative upon a selected frequency is passed to the electrical circuit, said electrical circuit comprising:
an input for receiving signals from the piezoelectric accelerometer device, one or more electronic filters,
a microcontroller coupled to the one or more electronic filters, which microcontroller periodically samples the received signals, and which discriminates between flush events and non-flush events.

8. The apparatus according to claim 7, wherein the electrical circuit operates to be responsive only to mechanical resonances of the toilet bowl.

9. The apparatus according to claim 8, wherein the electrical circuit operates to be responsive only to mechanical resonances of the toilet bowl which are caused by turbulent water flow within the toilet bowl.

* * * * *